March 23, 1948. A. GABRIEL 2,438,316
PRESSURE FLUID FOLLOW-UP SERVO-MOTOR
Filed April 7, 1945 4 Sheets-Sheet 1

Adam Gabriel,
Inventor.
Haynes and Koenig
Attorneys

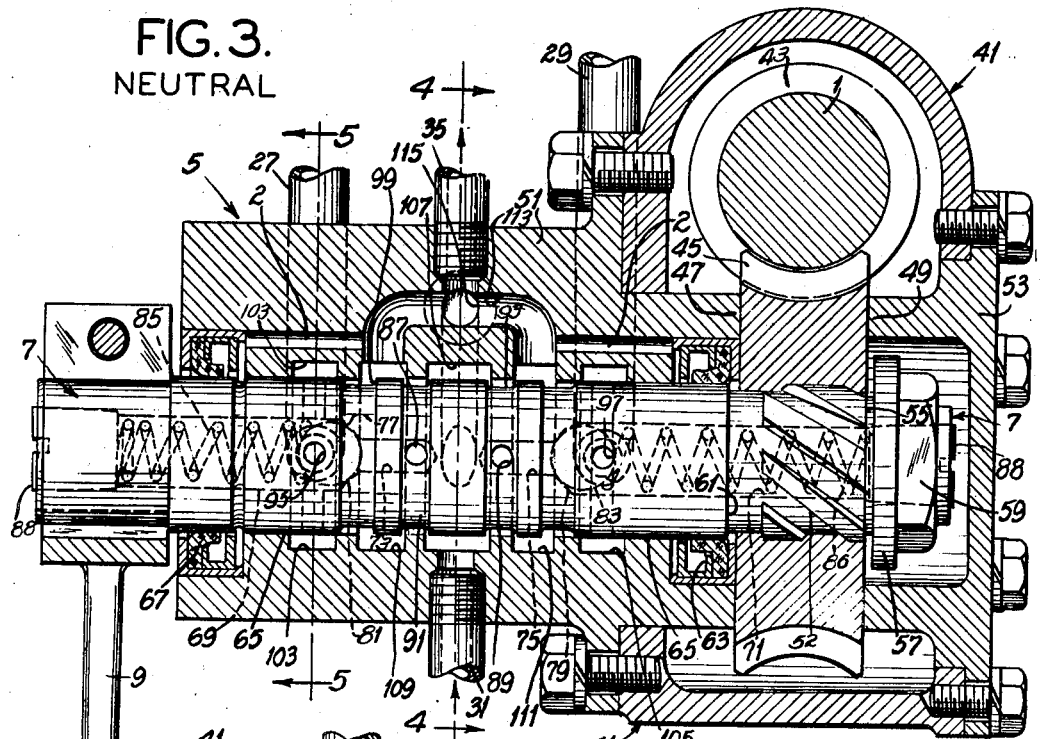
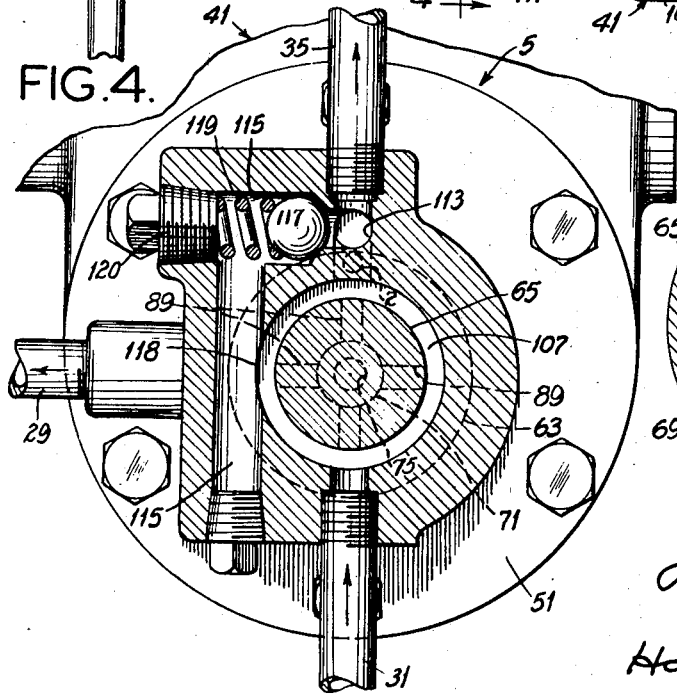
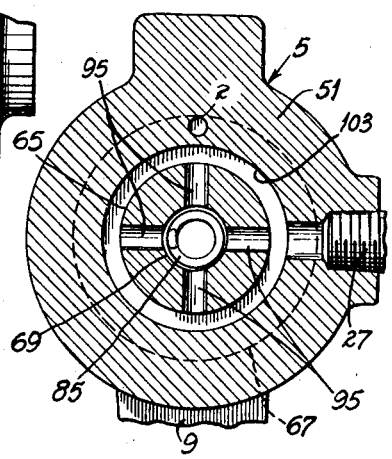
FIG. 3. NEUTRAL
FIG. 4.
FIG. 5.
Adam Gabriel,
Inventor.
Haynes and Koenig
Attorneys.

March 23, 1948.   A. GABRIEL   2,438,316
PRESSURE FLUID FOLLOW-UP SERVO-MOTOR
Filed April 7, 1945   4 Sheets-Sheet 3

TURNING RIGHT

Adam Gabriel,
Inventor.
Haynes and Koenig
Attorneys.

March 23, 1948. A. GABRIEL 2,438,316
PRESSURE FLUID FOLLOW-UP SERVO-MOTOR
Filed April 7, 1945 4 Sheets-Sheet 4

TURNING LEFT

Adam Gabriel,
Inventor.
Haynes and Koenig
Attorneys.

Patented Mar. 23, 1948

2,438,316

UNITED STATES PATENT OFFICE 2,438,316

PRESSURE FLUID FOLLOW-UP SERVOMOTOR

Adam Gabriel, River Forest, Ill., assignor, by mesne assignments, to Acme Industrial Hydraulics, Inc., Chicago, Ill., a corporation of Illinois Application April 7, 1945, Serial No. 587,152

9 Claims. (Cl. 121—41)

This invention relates to steering mechanisms, and with regard to certain more specific features, to a hydraulic servo steering mechanism.

Among the several objects of the invention may be noted the provision of a hydraulic servo steering mechanism in which a substantial proportion of the force required for steering is provided hydraulically; the provision of a steering mechanism of the class described in which the operating lash required for bringing into play the servo action is small; the provision of a steering mechanism of the class described in which a free-working manual control is instantly available in case of failure of hydraulic servo action; and the provision of a compact steering mechanism of this class which may readily be incorporated with the usual manual steering linkage and which fits readily into the small space usually available on vehicles and the like. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a diagrammatic side elevation on a reduced scale, partly in section, of a complete system incorporating the invention;

Fig. 3 is a vertical detail section taken on line 3—3 of Fig. 1 and showing a neutral position of parts;

Fig. 4 is a vertical section taken on line 4—4 of Fig. 3;

Fig. 5 is a vertical section taken on line 5—5 of Fig. 3;

Similar reference characters indicate corresponding parts throughout the several views of the drawings.

Figure 1:
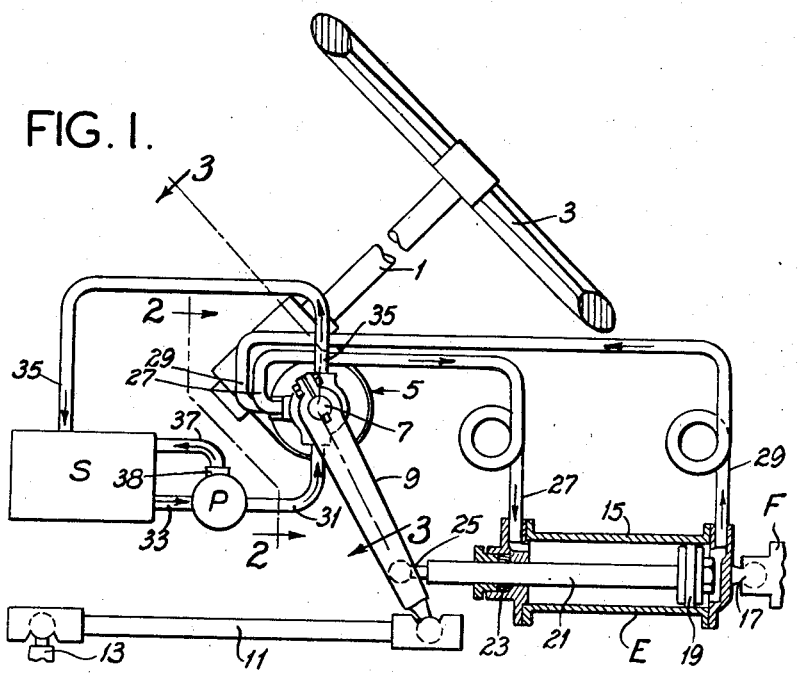
Figure 2:
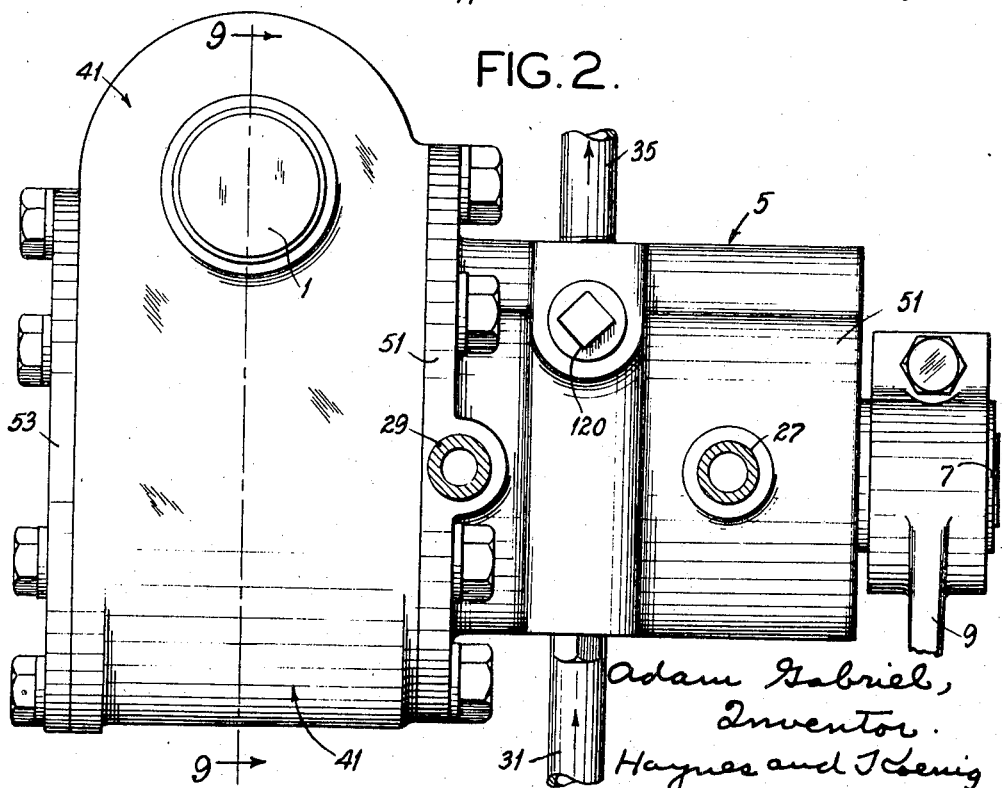
Fig. 2 is a vertical section taken on line 2—2 of Fig. 1.
Figure 6:
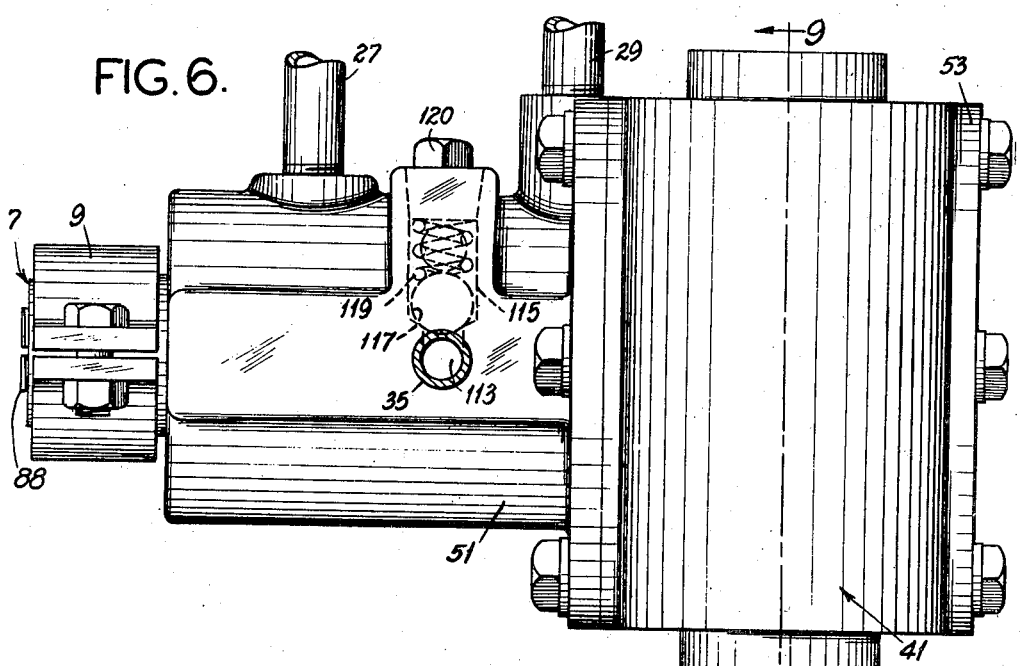
Fig. 6 is a plan view of the apparatus shown in Figs. 3, 7 and 8.

Referring now more particularly to Fig. 1, there is shown at numeral 1 a steering column of an automotive vehicle or the like carrying a steering wheel 3. The wheel 3 exemplifies any controller for the column 1. This column 1 extends from a gear and control box 5. The wheel 3 and column 1 control a shaft 7 in said box. This shaft 7 extends from the box to receive the usual rocking lever 9 which is part of the steering linkage of the vehicle. This linkage also includes a coupled link 11 which leads to a steering knuckle 13. Further details of the drag link mechanism driven from knuckles 13 are unnecessary, being known. The invention relates primarily to the apparatus for controlling the action of the rocking lever 9.

As will appear later, the shaft 7 not only applies rotary movement to the lever 9 but moves axially as a control valve for a hydraulic system. This system basically consists of a liquid sump tank S, a pump P and a reciprocating hydraulic servo engine E. The engine E consists of a cylinder 15 having a universal-joint support 17 on a fixed portion F on the frame of the vehicle. It also includes a piston 19 and a piston rod 21. The latter passes through a packing gland 23 and has a universal-joint connection 25 with the lever 9. Flexible liquid supply pipes 27 and 29 are connected to opposite ends of the cylinder 15 in order to apply pressure on opposite sides of the piston 19. The universal joints 17 and 25 permit cylinder 15 to pivot vertically about joint 17 upon rotation of lever 9 and horizontally about joint 17 upon axial movement of lever 9. Supply pipes 27 and 29 are flexible to permit movement of the cylinder. Any of the various ways of obtaining flexibility may be used in connection with these pipes, the two loops shown being diagrammatic in this respect. These pipes 27 and 29 pass to the case 5 and are under control of the action of the shaft 7 acting as a valve, as will appear later.

Also under control of shaft 7 is liquid flow through pipe 31 from pump P, the latter receiving its supply from the sump tank S over line 33. Fluid from pipe 31, under control of the shaft 7, may flow through the case 5 to the return pipe 35 to the sump S. The pump P also includes a bypass connection 37 to the sump in which is a spring-controlled unloader or release valve 38 which may be constituted by any of the known types of such valves. The pump P is driven from a suitable source of power on the vehicle.

Referring to Figs. 2–9, the box 5 will be seen to consist of a casing 41 in which are bearings for a worm gear 43, the latter being attached to the steering column 1. This worm gear 43 meshes with a worm wheel 45 which is prevented from moving axially by means of the ends 47 and 49 of enclosures 51 and 53, respectively bolted to opposite sides of the casing 41. This worm wheel 45 is helically splined through its central opening by means of which it is paired with a helically-splined portion 52 of the shaft 7.

Spaced at some distance to the right of the end of the splining 52 is a shoulder 55 for supporting a collar 57 which is held in place by a nut 59 threaded to the adjacent end of the shaft 7.

Spaced from the other side of splining 52 is a shoulder 61. In view of the above it will be seen that both of the elements 57 and 61 constitute spaced shoulders or flanges on opposite sides of the worm wheel 45, the spacing being such, with respect to opposite faces of the wheel, that some axial movement is possible between the shaft 7 and the wheel 45.

At 63 is shown a packing means for isolating in the box 5 the gear and spline elements on the right-hand end of the shaft 7 from the valve elements which are to be described in connection with its left-center portion.

The left-center portion of the shaft 7 forms a hollow cylindric valve stem which has a close fit (preferably a lap-fit) in a cylinder 65 formed through the body 51. Where this stem passes from the body 51 a suitable packing 67 is used. As will be seen from Figs. 7 and 8, the shaft 7 is made hollow, except at the center, by means of bores 69 and 71 from opposite ends. These bores 69 and 71 are bottomed by smaller extension bores 73 and 75, respectively. Bevelled portions 77 and 79 between the main bores and the extensions serve as seats for ball check valves 81 and 83. The valves 81 and 83 are normally biased shut by springs 85 and 86 reacting from enclosing plugs 88 threaded in the ends of the bores 69 and 71.

The bottoms of the smaller extension bores 73 and 75 have radial ports as shown at 87 and 89 which lead into grooves 91 and 93. Spaced a short distance from the outsides of the grooves 91 and 93 are additional grooves 99 and 101. The bores 69 and 71 are also radially ported as shown at 95 and 97, respectively. Ports 95 and 97 extend to the outer surface of the shaft 7 beyond the grooves 99 and 101 respectively.

Referring now to the body 51, it is internally grooved as shown at 103 and 105, these grooves being in communication with pipes 27 and 29, respectively. Normally, as shown at neutral in Fig. 3, these grooves 103 and 105 are cut off by the outside surfaces of the shaft 7. The ball check valves 81 and 83 also normally are closed, preventing communication out of these grooves through the ports 95 and 97, respectively.

The body 51 also has a central groove 107 which is in communication with the pressure supply pipe 31 from the pump P. Spaced from and adjacent to opposite sides of the groove 107 are grooves 109 and 111 which, through a D-shaped connection 113, are in communication with the exhaust pipe 35 to the sump S. As indicated in Fig. 4, the passage 113 has a by-pass connection 115 in which is a check valve 117, normally biased to its seat by means of a spring 119 reacting from an enclosing plug 120. This passage 115 is in communication at intersection 118 with the groove 107.

Operation is as follows:

It is assumed that the circulating system is full of a liquid such as for example hydraulic brake fluid, and that the pump P is operating. As is usual in apparatus including a sump and a circulating system for circulating fluid from the sump, the sump is partially filled with fluid. The parts initially may be considered to be in the Fig. 3 neutral position before steering starts. In this position circulation from the pump P to the sump S occurs through pipe 31, groove 107, grooves 91 and 93, grooves 109, 111, port 113, pipe 35 and back to the sump S. Check valve 117 (Fig. 4) is closed. Check valves 81 and 83 are also closed. Their springs are strong enough to hold them shut against the normal low free circulating pressure in the system.

Check valves 81 and 83 are provided to cut off flow of pressure fluid to opposite ends of cylinder 15 when the parts are in neutral (Fig. 3) position. Without these valves, pressure fluid entering groove 107 from pipe 31 would flow through ports 87, bore 73, ports 95, groove 103 and out through pipe 27 to the left end of cylinder 15, also through ports 89, bore 75, ports 97, groove 105 and out through pipe 29 to the right end of the cylinder. Thus, pressure on both sides of piston 19 would be equal, and since the area of the right side of the piston is larger than the area of its left side, the piston would be moved to the left. This would cause the vehicle constantly to drift to the left. The operator would have to steer constantly to the right to counteract the drift. Check valves 81 and 83 prevent such drift, however, by cutting off flow to opposite ends of the cylinder when the steering mechanism is in neutral position. When the parts are in such a position, fluid flows freely from pipe 31 back to the sump but the pressure on check valves 81 and 83 is insufficient to cause them to open.

Figure 7:
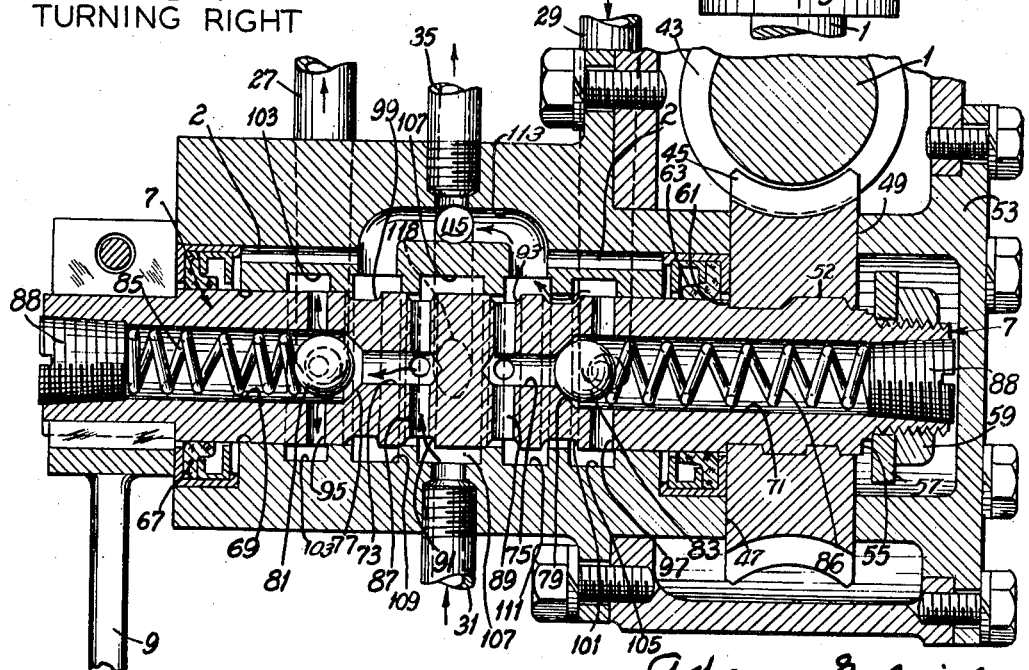
Fig. 7 is a view similar to Fig. 3 but showing the parts in one alternative steering position.
Figures 8, 9:
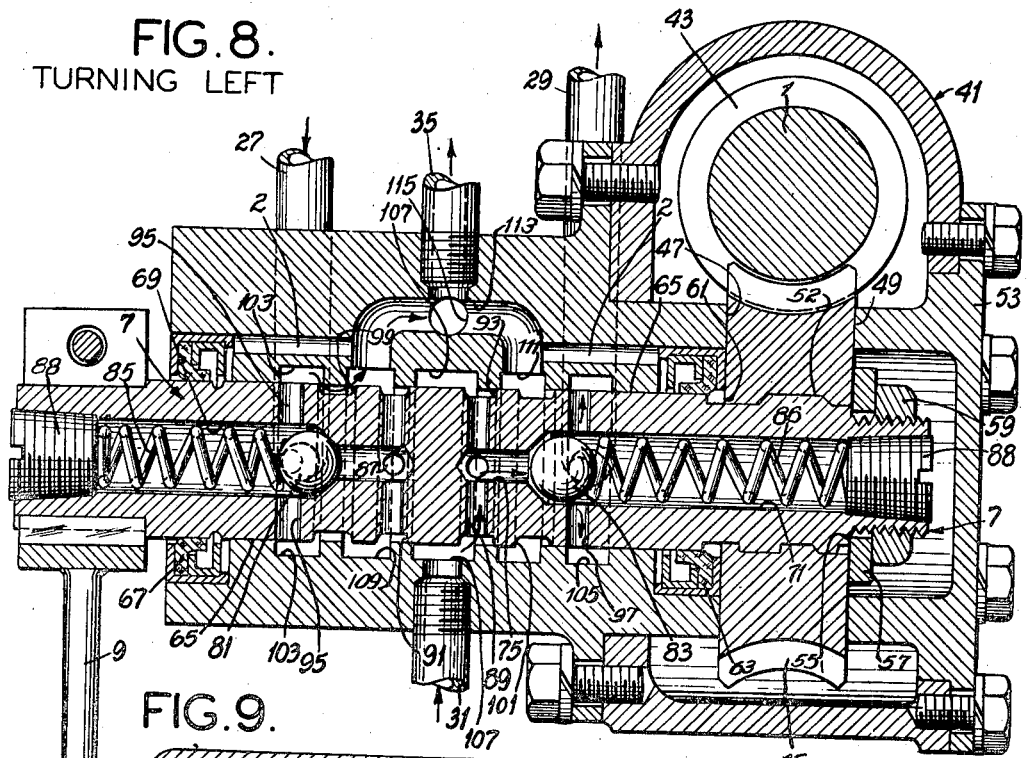
Fig. 8 is a view similar to Fig. 7 but showing the parts in the other alternative steering position; and, Fig. 9 is a vertical section taken on line 9—9 of Figs. 2 and 6.

Assume now that the operator turns the wheel 3 so that the worm wheel 45 turns counterclockwise in Fig. 9, which is to say with its upper portion over and away from the reader in Fig. 7. This corresponds to a clockwise movement of the steering wheel 3, looking down upon it in Fig. 1. Since the worm wheel 45 cannot move axially (laterally), the shaft 7 is cammed or threaded to the right as indicated in Fig. 7 by the camming action of the helically splined connection 52, until the shoulder 61 engages the left face of wheel 45. This lost-motion threading action of the shaft 7 resets it axially (as a valve) to the position shown in Fig. 7 which places the hydraulic circuit in the following condition:

Flow occurs from the pump P through pipe 31, groove 107, groove 91 (the other groove 93 being at this time cut off), ports 87, small bore 73, check valve 81 (which at this time under pressure is pushed open against spring 85) radial ports 95, groove 103, and out through pipe 27 to the left end of cylinder 15. This pushes the piston 19 to the right and through piston rod 21 applies counterclockwise movement to the lever 9. This causes the vehicle to steer right.

During the period of motion of the piston 19 to the right, liquid is pushed out over the line 29 to the groove 105, groove 101, groove 111, port 113 and to the line 35, passing freely back to the sump S.

Also, the fact that the shoulder 61 is pressed up against the wheel 45, results in a direct rigid mechanical connection between the steering wheel 3, column 1, worm 43, wheel 45, shaft 7, to the lever 9 tending also to rotate the lever 9 counterclockwise. The area of the piston 19 is so designed in relation to the hydraulic pressure in the system, that any desired proportion of the total moment required for steering is hydraulically supplied in servo fashion the remainder manually. Thus, as long as the operator continues to turn the wheel 3, both mechanical and hydraulic forces may be applied to turn the steering linkage.

As long as the operator continues to turn the wheel 3 in the direction first initiated, the shoulder 61 is held up against the wheel 45. This is a follow-up action. However, as soon as the operator stops turning the wheel 3, the motion of the worm wheel 45 lags with respect to the turning motion of the shaft 7 as caused by the servo action from the hydraulic system. This causes the shaft 7 to thread back from the position in Fig. 7 to the neutral position shown in Fig. 3 wherein flow to the pipe 27 is cut off and return circulation is reinstated through pipe 35 to the sump S.

When the operator turns the wheel 3 to the left, the worm wheel 45 has its upper portion turned toward the reader which threads the shaft 7 to the left as shown in Fig. 8. This permits flow from pipe 31 to groove 107, groove 93 (but not groove 91 which is at this time cut off), ports 89, bore 75 through ball check 83 which opens under pressure, ports 97, groove 105, to pipe 29 leading to the right-hand end of cylinder 15 and pressing the piston 19 to the left. Thus through the piston rod 21, the crank 9 is pushed clockwise which is in the same direction that the manual force through the mechanical linkage is pushing it by reason of the shoulder member 57 having run up against the right-hand side of the worm wheel 45.

During this period of motion of the piston 19 to the left, liquid is freely pushed out over the line 27 to groove 103, groove 99, groove 109, port 113 and to the pipe 35 which leads to the sump S.

Again, when the advancing motion of the steering wheel 3 is stopped, the hydraulically-actuated lever advancingly rotates the shaft 7 so that it screws out through the worm wheel 45 from the position shown in Fig. 8 back to that shown in Fig. 3.

It should be noted that although the check valves 81 and 83 will not open in response to free circulating pressure in the circuits from the pump to the sump when in neutral position (Fig. 3) these valves do open respectively under pressure from the pump when the shaft 7 is in either one of its two alternate steering positions shown in Figs. 7 and 8. This is because under these conditions more than the mere frictional pressure drop in the system is applied across the valves 81 and 83.

If during operation of the vehicle the pump P should fail, obviously the pressure in the hydraulic system would fail but this will not render the system mechanically inoperative. The vehicle could still be steered from the wheel 3 without the hydraulic servo action. This is because in either of the Fig. 7 or Fig. 8 relationship of parts the lever 9 is also being driven manually from the wheel 3 through post 1, worm 43, worm wheel 45, shaft 7 and lever 9 (helical slack being taken up at the left under the Fig. 7 conditions and at the right under the Fig. 8 conditions).

Furthermore, undesirable hydraulic resistance is eliminated under pure manual, non-servo steering conditions. This is accomplished as follows: Lever 9 transmits its manually supplied motion to the piston rod 21 and to piston 19, which pushes liquid out of the pipe 27 or the pipe 29, depending upon the direction of motion. Assuming that it is pushing liquid out of the pipe 29, this proceeds through the groove 105 (Fig. 7), groove 101, groove 111, port 113 and pipe 35 to the sump. The pump, which is not operating, impedes the flow of liquid from the sump. This causes pressure to build up in pipe 35 and port 113 to open ball check valve 117 (Fig. 4). Liquid then escapes through the ports 115, 118, groove 107 (Fig. 7), groove 91, ports 87, passage 73, check valve 81 (which opens), ports 95, groove 103 and to pipe 27. This supplies liquid to the left end of cylinder 15 in amount sufficient to fill the same. More liquid is pushed out of the right end of the cylinder than is required to fill its left end, but the excess is forced through pipe 35 to the sump. Frictional resistance and that supplied by valve 117 is negligible.

For pure manual, non-servo steering in the opposite direction liquid is forced by manual movement of the piston 19 out to the left, over line 27 (Fig. 8), groove 103, groove 99, groove 109, port 113, check valve 117 (Fig. 4), ports 115, 118, groove 107, ports 89, passage 75, open check valve 83, ports 97, groove 105, and to pipe 29 leading to the other side of the piston 19. While the amount of liquid forced out of the left end of the cylinder is insufficient to fill the right end, the additional amount needed to fill the right end is drawn from the sump.

From the above it will be seen that in an emergency of breakage of the pump P or the like that the vehicle may be steered manually while freely flowing liquid by-passes from one side of the piston 19 to its other side, as above described. Under these manual steering conditions there is no hydraulic servo action but it is possible for the driver manually to manage the vehicle for any distance required to get it to a point where the system can be repaired. Furthermore, the system may be made as safe and strong as prior full-mechanical systems.

In the drawings, Fig. 3 has been marked "neutral"; Fig. 7, "turning right"; and Fig. 8, "turning left." These terms are used advisedly since Figs. 7 and 8 show transient left-turning and right-turning functions. As soon as any transient turning operation of the operator is over, the valve automatically moves from either the Fig. 7 or Fig. 8 position to the neutral position shown in Fig. 3. Thus, the "neutral" position shown in Fig. 3 may occur in any angled position of the steering wheel to the right or left and when it is centered. The term neutral is applied to the central position assumed by the valve as shown in Fig. 3 whenever and wherever the steering wheel is stationary. The terms "turning right" and "turning left" refer to valve positions during right-turning and left-turning operations, respectively, of the steering wheel.

It will be understood that the worm 43 and worm wheel 45 may be of the irreversible or semi-reversible type, so far as kinematic transmission of reaction to and from the steering wheel is concerned.

An important feature of the invention is in the fact that a large number of the control elements are within confines which are not much larger than those ordinarily associated with steering gear boxes at present on the market. This is exclusive of the hydraulic operating cylinder parts, pump, sump and hydraulic circuits. These of course require additional space that would be needed in any event to provide servo control. That is to say, any servo control requires servo power generating parts.

Another advantage of the invention is that the mechanical connection between the steering wheel 3 and the steering mechanism of the vehicle on which the apparatus is located can be and is made with sufficient mechanical advantage that in the absence of servo action from the piston 19 the vehicle may in emergency be steered manually by the driver. Although it requires more effort on his part, matters are arranged so that it is not outside of his power.

Also, the lost motion which occurs between the worm wheel 45 and the shoulders 57 and 61 may be made of such a small amount that it is not noticeable in steering either with or without servo action. The reason for this low amount of lash is that the shaft 7 constitutes a piston valve wherein large open port areas are readily obtainable with small valve movements.

A detail of note is that passages 2 (Figs. 3, 7 and 8) serve to return to the exhaust pipe 35, and hence to the sump, any pressure leakage past the valve surface ports 65 of the shaft 7, before it passes packings 67 or 63.

In my copending application entitled Servo actuator, Serial No. 587,153, filed April 7, 1945, I have disclosed and claimed a valve similar to that shown herein, comprising a valve member which is mounted for axial and rotary movement in its housing and a control element rotary on the valve member for camming it axially in response to manual actuation, the valve member being able to rotate within the control element so that it may be returned to its initial axial position by the servo device.

In view of the above, it will be seen that the several objects of the invention are achieved and other advantageous results attained.

As many changes could be made in the above constructions without departing from the scope of the invention as defined in the appended claims, it is intended that all matter contained in the accompanying drawings shall be interpreted as illustrative and not in a limiting sense.

I claim:

1. A steering mechanism for use between a manually operable steering wheel and a steering linkage, a reversing hydraulic servo mechanism adapted reversibly to drive said linkage, a mechanical train between the wheel and linkage including a rotary shaft formed as an axially movable piston valve and a lost-motion helical connection between said steering wheel and shaft, said connection effecting limited axial movement of the shaft one way or another upon initiation of manual turning movement of said wheel one way or another for transmitting steering movement to said linkage, a hydraulic circuit controlled by axial movement of said shaft functioning as a valve, said valve being adapted to control the supply of liquid under pressure alternatively to said hydraulic mechanism so as to cause it to drive said linkage with reversible movements which follow up the reversible manual steering movements from said wheel, the hydraulic mechanism upon cessation of manual operation of the steering wheel supplying overrunning movement to the rotary shaft to reset it as a valve to cut off the supply of liquid to the hydraulic mechanism and to neutralize its action.

2. In a steering gear box and control for use between a steering member and a steering linkage, the latter being connected with hydraulic servo motor means having a hydraulic circuit, a casing, a drive wheel therein, means for rotating said drive wheel, said casing having a bore coaxial with the axis of said wheel, a rotary and axially movable piston valve shaft in said bore serving as a valve in said circuit and as a driving link between said steering member and linkage, a lost-motion helical connection between said wheel and the valve shaft, said connection being arranged to permit an initial limited axial movement of the valve shaft in response to rotary driving action between the wheel and the shaft.

3. In a steering gear box and control for use between a steering member and a steering linkage, the latter being connected with a hydraulic servo motor having hydraulic pressure and servo supply circuits, a casing, a drive wheel therein, said casing having a bore coaxial with the axis of said wheel, a rotary and axially movable piston valve shaft in said bore, a lost-motion helical connection between said wheel and the valve shaft, said connection permitting a limited axial reciprocation of the valve shaft in response to mechanical driving action through the wheel, said casing having a central port, two connected side ports spaced therefrom and two end ports, said side ports being in parallel connection with the pressure circuit, and said end ports being in circuit connections with the hydraulic servo supply circuit, said valve shaft having opposite hollow portions ending in spaced central ports and spaced end ports with check valves respectively between the central ports and the end ports, said valve shaft having intermediate ports, all so arranged that when said valve shaft is in a neutral position flow may occur around the pressure circuit in parallel through said side ports in the casing, and when the shaft is in either of its two displaced axial positions flow is diverted from said pressure circuit to one or the other of said check valves to the hydraulic servo circuit with return back to said pressure circuit.

4. In a steering gear box and control for use between a steering member and a steering linkage, the latter being connected with a hydraulic servo motor having hydraulic pressure and servo supply circuits, a casing, a drive wheel therein, said casing having a bore coaxial with the axis of said wheel, a rotary and axially movable piston valve shaft in said bore, a lost-motion helical connection between said wheel and the valve shaft, said connection permitting a limited axial reciprocation of the valve shaft in response to mechanical driving action through the wheel, said casing having a central port, two connected side ports spaced therefrom and two end ports, said side ports being in parallel connection with the pressure circuit and said end ports being in circuit connections with the hydraulic servo supply circuit, said valve shaft having opposite hollow portions ending in spaced central ports and spaced end ports with check valves respectively between the central ports and the end ports, said valve shaft having intermediate ports, all so arranged that when said valve shaft is in a neutral position flow may occur around the pressure circuit in parallel through said side ports in the casing, and when the shaft is in either of its two displaced axial positions flow is diverted from said pressure circuit to one or the other of said check valves to the hydraulic servo circuit with return back to said pressure circuit, and a by-pass having a check valve therein connecting said side ports in the casing with its central port, whereby flow is accommodated from said end ports in the casing through the intermediate ports in the valve shaft in either one of the non-neutral positions of said shaft, whereby fluid may flow through the servo circuit independently of the pressure circuit.

5. In a servo steering mechanism a combined valve and gear train comprising a casing formed as a valve cylinder, a drive shaft formed as a valve fitting said cylinder, said drive shaft being rotary for mechanical force transmission and having limited axial movement for valve action, a rotary driving member in the casing, means for rotating said rotary member, and a lost-motion helical connection between said rotary member and the shaft, whereby the rotary member may initially move the shaft axially for valve action and thereafter rotate it without further axial movement for mechanical transmission action.

6. In a hydraulic steering mechanism a combined valve and gear train comprising a casing formed as a peripherally grooved valve cylinder, a drive shaft formed as a peripherally grooved piston valve fitting said cylinder, said drive shaft being rotary for force transmission and having limited axial movement for valve action, a rotary driving gear in the casing, means for rotating said gear, and a lost-motion threaded connection between said gear and the shaft, whereby the rotary gear may initially move the shaft axially within limits for valve action and thereafter rotate it without further axial movement for rotary mechanical driving action.

7. In a servo steering mechanism a combined valve and gear train comprising a casing formed as a peripherally grooved valve cylinder, a drive shaft formed as a peripherally grooved piston valve closely fitting said cylinder for limited axial movement and rotary movement, said rotary movement being for force transmission and the axial movement for valve action, a rotary worm wheel mounted in the casing, a rotary worm mounted in the casing and driving the worm wheel, and a lost-motion helical connection between said worm wheel and the shaft, whereby the worm wheel may initially move the shaft axially for limited valve action and thereafter rotate it without further axial movement for rotary mechanical driving action.

8. In a servo steering mechanism a combined valve and gear train comprising a casing formed as a valve cylinder, a drive shaft formed as a piston valve fitting said cylinder, said drive shaft being rotary for force transmission and having limited axial movement for valve action, a rotary driving member in the casing and a helical connection between said rotary member and the shaft, whereby the rotary member may initially move the shaft axially for limited valve action and thereafter rotate it without further axial movement for mechanical driving action, said casing having a pressure supply and an exhaust port connected to a hydraulic pressure circuit and also having separate supply ports connected to a hydraulic servo circuit, said casing having a central port, two connected side ports spaced therefrom and commonly connected to the exhaust port and also having two end ports, said end ports being in connection with the servo circuit, said rotary shaft having opposite hollow portions ending in spaced central ports and spaced end ports with check valves respectively between the central ports and the end ports, said valve shaft having intermediate ports; all the ports being so arranged that when said valve shaft is in a neutral position with respect to its total axial movement, flow may occur around the pressure circuit through the central shaft ports and said side ports in the casing, and when the shaft is in either of its two displaced axial positions flow is diverted from said pressure circuit through one or the other of said check valves to the end casing ports and to the servo circuit, with return to said exhaust.

9. In a servo steering mechanism a combined valve and gear train comprising a casing formed as a valve cylinder, a drive shaft formed as a piston valve closely fitting said cylinder, said drive shaft being rotary for force transmission and having limited axial movement for valve action, a rotary driving member in the casing and a helical connection between said rotary member and the shaft, whereby the rotary member may initially move the shaft axially for valve action and thereafter rotate it without further axial movement for mechanical driving action, said casing having a pressure supply and an exhaust port connected to a hydraulic pressure circuit and also having separate supply ports connected to a hydraulic servo circuit, said casing having a central port, two connected side ports spaced therefrom and commonly connected to the exhaust port and also having two end ports, said end ports being in connection with the servo circuit, said rotary shaft having opposite hollow portions ending in spaced central ports and spaced end ports with check valves respectively between the central ports and the end ports, said valve shaft having intermediate ports; all the ports being so arranged that when said valve shaft is in a neutral position with respect to its total axial movement, flow may occur around the pressure circuit through the central shaft ports and said side ports in the casing, and when the shaft is in either of its two displaced axial positions flow is diverted from said pressure circuit through one or the other of said check valves to the end casing ports and to the servo circuit, with return to said exhaust; and a by-pass connection between said side ports in the casing to its central port and having a check valve opening from the former to the latter, whereby flow may be established between said servo supply ports independently of the circuit between the pressure supply port and the exhaust port.

ADAM GABRIEL.

REFERENCES CITED

The following references are of record in the file of this patent:

UNITED STATES PATENTS

| Number | Name | Date |
|---|---|---|
| 1,773,794 | Schneider | Aug. 26, 1930 |
| 1,790,620 | Davis | Jan. 27, 1931 |
| 1,914,267 | Leupold | June 13, 1933 |
| 1,959,177 | Sassen | May 15, 1934 |
| 2,037,505 | Eaton | Apr. 14, 1936 |
| 2,213,271 | Davis | Sept. 3, 1940 |
| 2,362,945 | Stephens | Nov. 14, 1944 |
| 2,370,137 | Biggert | Feb. 27, 1945 |